J. MUELLER.
CLUTCH RELEASE.
APPLICATION FILED MAR. 11, 1920.
1,383,328.
Patented July 5, 1921.
2 SHEETS—SHEET 2.
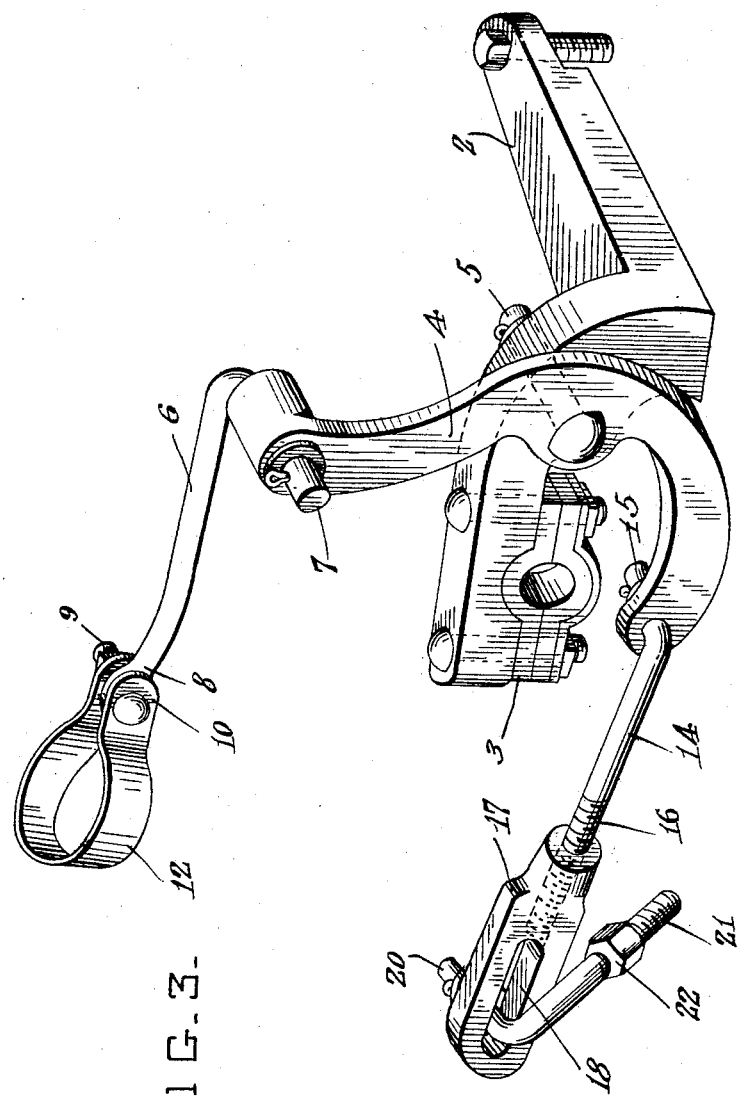
Inventor.
Joseph Mueller
by Herbert W. Jenner
Attorney.

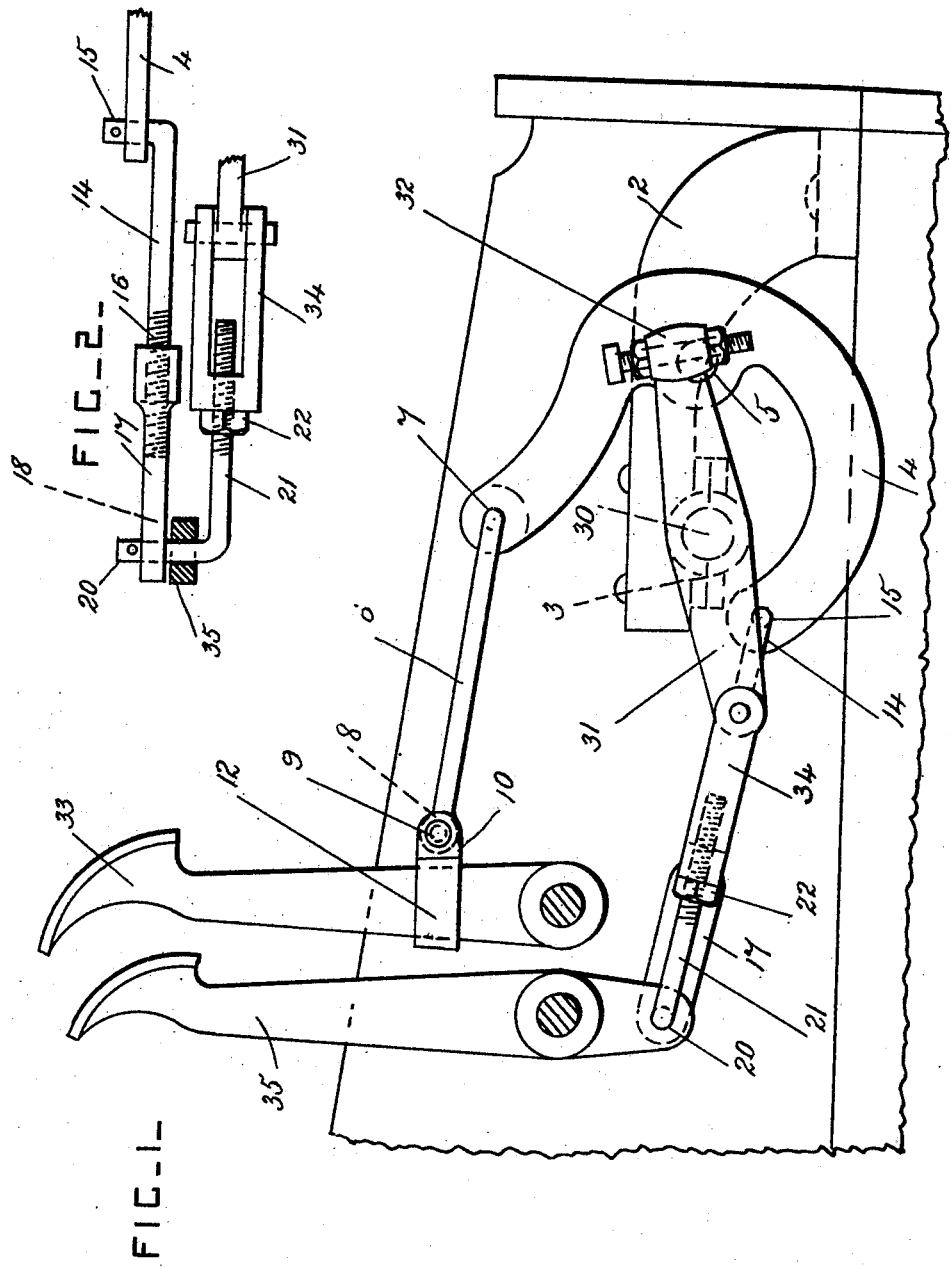

UNITED STATES PATENT OFFICE.

JOSEPH MUELLER, OF TERRE HAUTE, INDIANA.

CLUTCH-RELEASE.

1,383,328.

Specification of Letters Patent.  Patented July 5, 1921.

Application filed March 11, 1920. Serial No. 365,191.

*To all whom it may concern:*

Be it known that I, JOSEPH MUELLER, a citizen of the United States, residing at Terre Haute, in the county of Vigo and State of Indiana, have invented certain new and useful Improvements in Clutch-Releases, of which the following is a specification.

This invention relates to devices for connecting the clutch pedal of a motor car with the brake lever thereof; and it consists in the novel construction and combination of the parts hereinafter fully described and claimed whereby the motor clutch is automatically released when the brake lever is operated, and without hindering the changing of speeds.

In the drawings, Figure 1 is a diagrammatic view, showing how the device is applied on a Ford car. Fig. 2 is a plan view showing the parts that connect the levers 4 and 31 with the clutch pedal 35.

Fig. 3 is a perspective view of an automatic clutch release constructed according to this invention.

A supporting bracket 2 is provided, and is secured to any convenient part of the car, and this bracket has a bearing 3 for the shaft 30 of the clutch lever 31 which has an end portion 32 of approved construction for the usual hand-operated emergency brake lever of a Ford car to engage with.

A lever 4 has its middle part pivoted by a pin 5 to the bracket 2, and a rod 6 is pivoted to the upper end portion of this lever by a pin 7. The rod has a single-eye 8 at its free end which is pivoted by a pin 9 to the end portions 10 of a strap 12 which is adapted to be clamped upon the brake lever 33 of the car.

A rod 14 is pivoted by a pin 15 to the lower end portion of the lever 4, and it has a screwthreaded free end portion 16.

A block 17 is secured adjustably on the end portion 16, and is provided with a longitudinal slot 18. A pin 20 is slidable in the slot 18, and it has a screwthreaded connecting-rod 21 on one end which is provided with a nut 22. The rod 21 is operatively connected with the clutch mechanism or clutch lever 31 by a double-eye or link 34.

When the clutch pedal 35 is pushed into its slow speed position, the pin 20 slides in the slot 18, so that the speed can be changed without hindrance.

When the foot brake lever 33 is pushed forward, the lever 4 moves the rod 14 rearwardly, and releases the clutch by means of the rod 21.

What I claim is:

In an automatic clutch release, a stationary support, a lever having its middle part pivoted to the support, a rod pivoted to the upper end portion of the said lever, a strap for engaging a brake lever, said strap being pivoted to the said rod, a screwthreaded rod pivoted to the lower end portion of the said lever, a longitudinally slotted block adjustable on the said screwthreaded rod, and a connecting-rod for engagement with the clutch lever, said connecting-rod having a laterally projecting pin at one end which is slidable in the slot of the said block.

In testimony whereof I have affixed my signature.

JOSEPH MUELLER.